Figure 1:
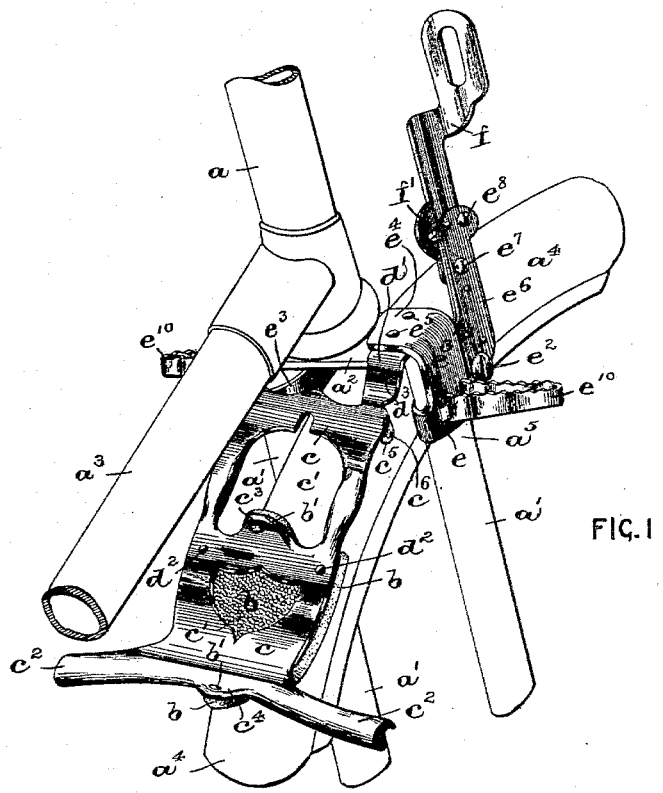

(No Model.)

W. J. FITZGERALD.
BRAKE FOR BICYCLES, &c.

No. 563,759.

3 Sheets—Sheet 1.

Patented July 14, 1896.

WITNESSES:
Wm. H. Canfield Jr.
Marcy Z. Drisdell

INVENTOR:
WILLIAM J. FITZGERALD.
BY
Fred C. Fraentzel,
ATTORNEY (No Model.)
W. J. FITZGERALD.
BRAKE FOR BICYCLES, &c.
No. 563,759.  Patented July 14, 1896.
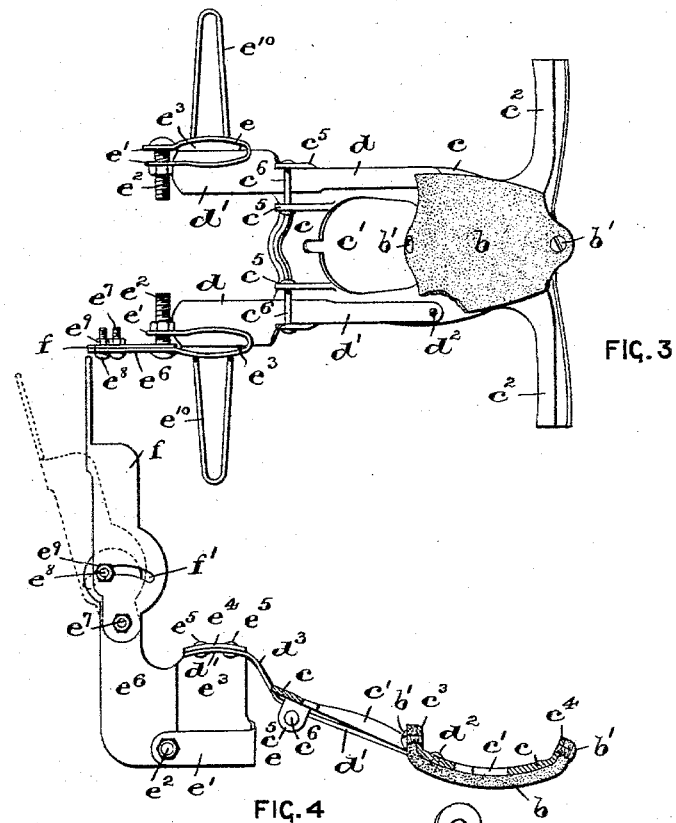
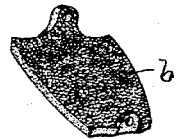
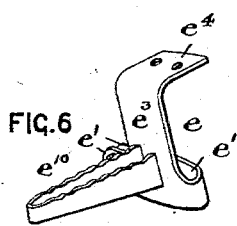
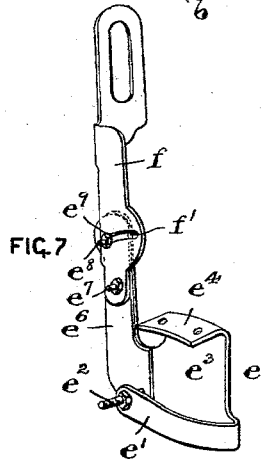
WITNESSES:
INVENTOR:
WILLIAM J. FITZGERALD.
BY
Fred C. Fraentzel,
ATTORNEY (No Model.) 3 Sheets—Sheet 3.

W. J. FITZGERALD.
BRAKE FOR BICYCLES, &c.

No. 563,759. Patented July 14, 1896.

WITNESSES:

INVENTOR:
WILLIAM J. FITZGERALD.
BY
Fred'k C. Fraentzel,
ATTORNEY

UNITED STATES PATENT OFFICE.

WILLIAM J. FITZGERALD, OF BROOKLYN, NEW YORK.

BRAKE FOR BICYCLES, &c.

SPECIFICATION forming part of Letters Patent No. 563,759, dated July 14, 1896.

Application filed December 16, 1895. Serial No. 572,233. (No model.)

*To all whom it may concern:*

Be it known that I, WILLIAM J. FITZGERALD, a citizen of the United States, residing at Brooklyn, in the county of Kings and State of New York, have invented certain new and useful Improvements in Brakes for Bicycles, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in brakes for bicycles and other like vehicles, which are adapted to be secured to the front steering-frame of the vehicle, and may also be provided with "coasters" arranged against the sides of the forked steering-frame of the vehicle; and may also be provided with a lamp-bracket, preferably adjustably arranged in connection with the brake, so that the light can be thrown any distance ahead without changing the position of the bracket.

The invention therefore has for its primary object to provide an improved foot-brake for bicycles or the like, comprising therein a pair of clamps adapted to hug the crown of the steering-post and braced against the outer surfaces of the two arms of the said frame, so that when the rider exerts a pressure on the foot-piece of the brake there will be no direct strains against the weaker parts of the forked steering-frame to cause any distortion of these parts.

A further object of the invention is to provide a quick-acting brake of the class hereinabove stated, by means of which the rider has perfect control of the wheel, and when coasting, the forward part of the feet of the rider resting on the coasters with the heel parts resting directly on the brake, and all that is necessary is to slightly depress the foot to put on the brake; at the same time, by resting the toe part of the foot on the coaster, the rider can just as readily dismount, without the least possible danger of being thrown.

My invention therefore consists in the novel construction of brake herein set forth and the novel arrangements and combinations of the several parts, such as will be hereinafter fully described in the accompanying specification, and finally embodied in the clauses of the claim.

With these several ends in view, the invention is clearly illustrated in the accompanying sheets of drawings, in which—

Figure 2:
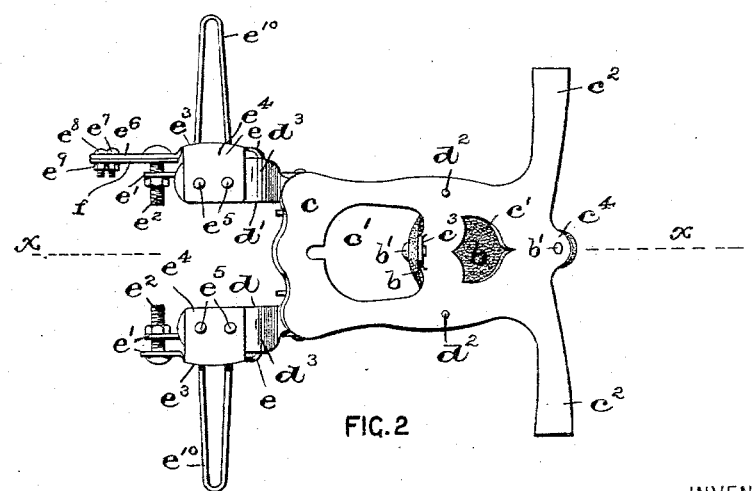
Figure 8:
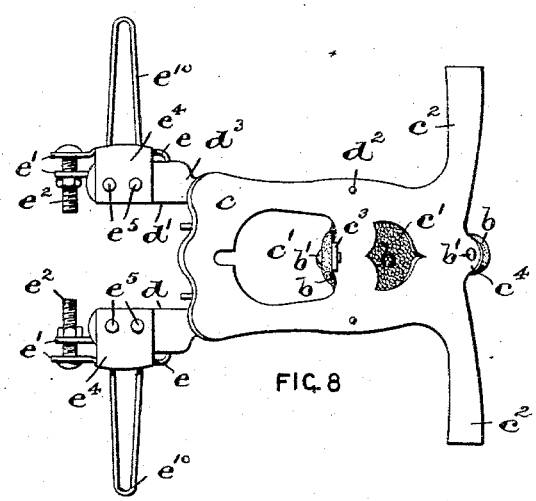
Figure 9:
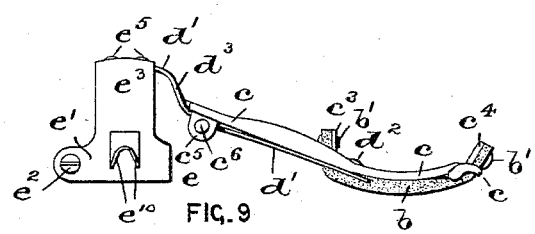
Figure 10:
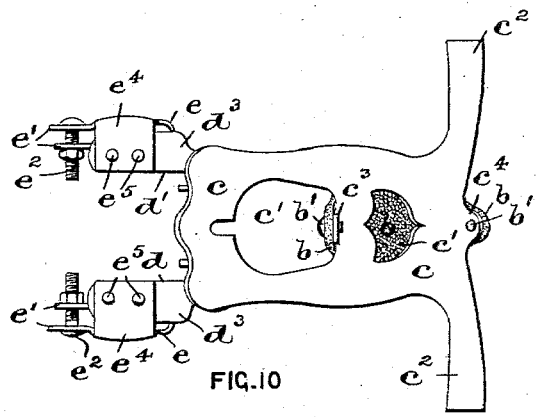

Figure 1 is a perspective view of part of the front steering-frame and tire of the wheel of a velocipede, with my novel construction of brake secured in its operative position to said frame. Fig. 2 is a top view of the brake illustrated in said Fig. 1. Fig. 3 is a bottom view of the same, clearly showing an arrangement of a detachable soft leather or other like shoe; and Fig. 4 is a longitudinal vertical section of the brake, taken on line $x$ in Fig. 2. Fig. 5 is a perspective view of the detachable leather shoe. Fig. 6 is a similar view of one of the coasters and its clamping means; and Fig. 7 is a like view of the combined clamping or holding device and adjustable lamp-bracket. Fig. 8 is a plan view of a brake embodying the principles of my invention, in which the lamp-bracket is dispensed with. Fig. 9 is a side view of the same; and Fig. 10 is a view similar to that illustrated in Fig. 8, in which both the lamp-bracket and coasters are dispensed with.

Similar letters of reference are employed in all of the above-described views to indicate corresponding parts.

Referring to the said drawings, $a$ is the steering-socket of the vehicle, $a'$ the bifurcated end of the steering-post, of which $a^2$ is the crown, $a^3$ is the backbone of the frame of the vehicle, and $a^4$ is the rubber or cushion tire of the front steering-wheel of the vehicle.

My novel form and construction of foot-brake consists, essentially, of the metal foot-piece $c$ of any desired ornamentation or configuration in outline, said foot-piece, which is usually made of cast metal to produce strength in the construction and cheapness in the cost of manufacture, being provided with the open parts $c'$, whereby the weight of the appliance is considerably diminished without detriment to the strength and operativeness of the brake construction. Said main portion $c$ of the brake is preferably provided at the extreme lowest point with oppositely-extending footrests $c^2$ and also with the perforated and upwardly-projecting teats or holding portions $c^3$ and $c^4$. In screw-threaded perforations in said teats or portions $c^3$ and $c^4$ are screws $b'$, which fix a shoe $b$ of soft leather or any other suitable material to the under surface of the said main portion $c$ at that point where it is forced in "braking" contact with the surface of the tire $a^4$ of the wheel. Said soft-leather shoe being detachably secured to the main portion $c$ of the brake, it can be readily removed when worn out and quickly replaced by a new shoe when necessary, as will be clearly evident.

Pivotally attached to the under surface of the main portion $c$, by means of pins or screws $d^2$, are a pair of desirably-shaped spring-bars $d$ and $d'$, which pass between pairs of downwardly-extending lugs or ears $c^5$, said spring-bars being operatively retained between said lugs or ears by suitable pins $c^6$, secured therein, as will be clearly evident from an inspection of Figs. 3 and 4. The forward ends of said spring-bars $d$ and $d'$ are upwardly curved, as at $d^3$.

Suitable clamping frames or devices $e$ are provided, having the curved clamping or holding tongues $e'$, and the fastening-screws $e^2$ in the perforated ends of said holding-tongues, (see more particularly Figs. 3, 4, 6, and 7,) whereby the frames or pieces $e$ can be clamped around the arms $a'$ of the steering-fork of the frame of the vehicle; but, in addition to this, each frame or clamping device $e$ is provided with an upwardly-extending portion $e^3$, which fits closely to the outer face $a^5$ of each arm $a'$, and also with a supporting portion $e^4$, bent at a right angle, or approximately so, to the part $e^3$, said portion extending over the crown $a^2$ of the steering-fork, substantially as illustrated in Fig. 1. The forward and curved end portions $d^3$ of said spring-bars $d$ and $d'$ are also secured to the supporting portions $e^4$ by means of screws or rivets $e^5$, shown in the several figures of the drawings, or these parts can be secured together in any other well-known manner. Thus it will be seen that when the brake is attached to the steering fork or frame of the vehicle and the rider bears his foot firmly upon the brake-body $c$ the strain is brought directly upon the portions $e^4$ and the side parts $e^3$ of said clamping frames or devices $e$, whereby these parts are practically secured to the arms $a'$ of the steering-frame in rigid positions, and there is not the least danger of forcing the clamps or devices $e$ from their positions on the steering-frame, or of injuring or straining said frame in the least, when too excessive a pressure is applied to the brake. From the outer surfaces of the portions $e^3$ of said clamping frame or devices $e$ extend the usual forms of coaster-bars $e^{10}$, which are secured thereto in any well-known manner.

As has been stated, and as will be clearly evident from an inspection of Fig. 3, the hereinabove mentioned spring-plates $d$ and $d'$ are pivotally connected with the main body $c$ of the foot-brake, and are therefore capable of a lateral movement limited to the space between the pairs of lugs or ears $c^5$ on said portion $c$, whereby the two clamping frames or holding devices $e$, to secure the brake to the steering head or frame of the vehicle, can be brought nearer together or farther apart to fit the different makes of construction of steering forks. It will therefore be seen that I have produced a simple construction of brake, which will be found very useful in connection with the various kinds of manufacture of bicycles and allows of readily adjusting the clamping means connected therewith, to fit the forked arms and the crowns of different widths. In Figs. 1, 2, 4, and 7, I have illustrated one of the clamping or holding devices $e$ provided with a forwardly and upwardly extending arm $e^6$, to which I have adjustably secured a suitable lamp-bracket or post $f$. Said post, which in general appearance is of the ordinary and well-known construction, is pivotally arranged on a pin, screw, or bolt $e^7$, secured to the arm $e^6$, and $e^8$ is a second bolt, screw, or pin, which extends into a curved slot $f'$ in the lamp-bracket $f$, whereby the latter, by means of a suitable nut $e^9$ on said screw, pin or bolt, can be fixed in any desired position on said arm $e^6$, as will be clearly evident. By means of this adjusting device the light can be readily arranged to suit the rider and can be thrown any distance ahead without changing the position of the lamp on the bicycle-frame.

In Figs. 8 and 9, I have shown a construction of brake embodying the leading features of my invention, but in which both of said clamping-frames or holding devices $e$ are alike, being of the form and construction represented more particularly in Fig. 6, and in which I have dispensed with the use of the arm or post $e^6$ on the one holding device $e$, and also with the lamp-bracket $f$.

In Fig. 10, I have illustrated still another form of brake, which embodies the principles of my present invention, but in which I have dispensed with the use of the coaster-bars $e^{10}$ and also with the use of the lamp-bracket $f$.

The essential features and the construction of the main body or frame $c$ of the brake, illustrated in these last-mentioned figures of the drawings, being in all respects similar to the construction illustrated and described in connection with Figs. 1, 2, 3, and 4 of the drawings, need, therefore, not be further described here. By my improvements, I have devised a simply-constructed and a cheap and ornamental foot-brake for velocipedes, or the like, which may be provided with coasters and lamp-bracket, if desired, to enable the rider to have perfect control of the wheel under all conditions, making collisions and accidents almost an impossibility.

The lamp-bracket, when used in connection with the brake, is in the proper place, as a lantern on the front axle is too low, and on the handle-bars too high, to give proper results;

but when in place directly in front of the crown of the steering-frame it is just right to give the best results.

It will also be evident that the various constructions and arrangements of the several parts of the brake may be varied without departing from the scope of my present invention, and hence I do not limit myself to the exact arrangements and combinations of the several parts as herein shown and described.

Having thus described my invention, what I claim is—

1. A brake for velocipedes or the like, comprising therein, a main body or shoe, a pair of spring-plates, pivotally attached to the under side of said main body or shoe, said spring-plates being capable of a lateral movement, a pair of holding or clamping devices to which said spring-plates are secured, and means for securing said holding or clamping devices to the arms of the steering-frame of the vehicle, substantially as and for the purposes set forth.

2. A brake for velocipedes or the like, adapted to be secured to the crown of the steering-frame of the vehicle, comprising therein, a main body, as c, having downwardly-extending ears or lugs, and retaining-pins therein, a pair of pivotally-arranged spring-plates, passing between said lugs or ears, and held in position therein by said pins, and a pair of holding or clamping devices attached to said spring-plates, and means for securing said holding or clamping devices to the arms of the steering-frame, substantially as and for the purposes set forth.

3. A brake for velocipedes or the like, adapted to be secured to the crown of the steering-frame of the vehicle, comprising therein, a main body, as c, having downwardly-extending ears or lugs, and retaining-pins therein, a pair of pivotally-arranged spring-plates, passing between said lugs or ears, and held in position therein by said pins, and a pair of holding or clamping devices attached to said spring-plates, having upwardly-extending side pieces adapted to hug the outer faces of the arms of the steering-frame, supporting portions on said side pieces and arranged on the crown of said frame, and means for securing said holding or clamping devices to the arms of the steering-frame, substantially as and for the purposes set forth.

4. A brake for velocipedes or the like, adapted to be secured to the crown of the steering-frame of the vehicle, comprising therein, a main body or shoe, a pair of spring-plates pivotally attached to said main body or shoe, said spring-plates being capable of a lateral movement, a pair of holding or clamping devices to which said spring-plates are attached, said holding or clamping devices having side pieces adapted to hug the outer faces of the frame, and supporting portions on said holding or clamping devices adapted to be arranged on the crown of said frame, substantially as and for the purposes set forth.

5. A brake for velocipedes or the like, adapted to be secured to the crown of the steering-frame of the vehicle, comprising therein, a main body or shoe, a pair of spring-plates pivotally attached to said main body or shoe, said spring-plates being capable of a lateral movement, and means on said main body or shoe to limit the lateral movement of said spring-plates, a pair of holding or clamping devices to which said spring-plates are attached, and means for securing said holding or clamping devices to the arms of the steering-frame of the vehicle, substantially as and for the purposes set forth.

In testimony that I claim the invention set forth above I have hereunto set my hand this 11th day of December, 1895.

WILLIAM J. FITZGERALD.

Witnesses:
   HARRY B. BROWN,
   CHAS. M. HUGHES.